United States Patent
Revel et al.

(10) Patent No.: US 9,573,852 B2
(45) Date of Patent: Feb. 21, 2017

(54) METHOD FOR BRAZING PARTS MADE FROM A COMPOSITE MATERIAL, WITH ANCHORING OF THE BRAZED JOINT

(71) Applicants: HERAKLES, Le Haillan (FR); Commissariat à l'énergie atomique et aux énergies alternatives, Paris (FR)

(72) Inventors: Thomas Revel, Bordeaux (FR); Eric Conete, Merignac (FR); Eric Philippe, Merignac (FR); Valérie Chaumat, St Paul de Varces (FR)

(73) Assignees: COMMISSARIAT À L'ÉNERGIE ATOMIQUE ET AUX ÉNERGIES ALTERNATIVES, Paris (FR); HERAKLES, Le Haillan (FR)

( * ) Notice: Subject to any disclaimer, the term of this patent is extended or adjusted under 35 U.S.C. 154(b) by 0 days.

(21) Appl. No.: 14/415,393

(22) PCT Filed: Jul. 12, 2013

(86) PCT No.: PCT/FR2013/051671
§ 371 (c)(1),
(2) Date: Jan. 16, 2015

(87) PCT Pub. No.: WO2014/013165
PCT Pub. Date: Jan. 23, 2014

(65) Prior Publication Data
US 2015/0203412 A1    Jul. 23, 2015

(30) Foreign Application Priority Data
Jul. 18, 2012   (FR) ..................................... 12 56947

(51) Int. Cl.
*B23K 31/02*   (2006.01)
*C04B 37/00*   (2006.01)
(Continued)

(52) U.S. Cl.
CPC ........... *C04B 37/006* (2013.01); *B23K 1/0018* (2013.01); *B23K 1/19* (2013.01); *B23K 1/20* (2013.01);
(Continued)

(58) Field of Classification Search
CPC .......... B23K 1/08; B23K 1/20; B23K 2203/16
(Continued)

(56) References Cited

U.S. PATENT DOCUMENTS 5,975,407 A    11/1999   Gasse et al.
7,497,918 B2   3/2009    Thebault et al.
(Continued)

FOREIGN PATENT DOCUMENTS

| EP | 0 806 402 | 11/1997 |
|---|---|---|
| WO | WO 2011/029785 | 3/2011 |
| WO | WO 2011/113760 | 9/2011 |

OTHER PUBLICATIONS

International Search Report as issued for PCT/FR2013/051671.

*Primary Examiner* — Erin Saad
(74) *Attorney, Agent, or Firm* — Pillsbury Winthrop Shaw Pittman LLP

(57) ABSTRACT

A method of assembling together by brazing two parts made of composite material, each part having an assembly face for brazing with the assembly face of the other part, the method including: making a plurality of cavities in the assembly face of at least one of the two composite material parts, at least some of the cavities opening out into one or more portions of the part that are situated outside the assembly face; interposing capillary elements between the assembly faces of the composite material parts; placing a brazing composition in contact with a portion of the capillary elements; and applying heat treatment to liquefy the brazing composition so as to cause the molten brazing composition to spread by (Continued)

capillarity between the assembly faces of the composite material parts.

9 Claims, 3 Drawing Sheets

(51) Int. Cl.
    *B82Y 30/00*     (2011.01)
    *B23K 1/00*     (2006.01)
    *B23K 1/19*     (2006.01)
    *B23K 1/20*     (2006.01)

(52) U.S. Cl.
    CPC .............. *B82Y 30/00* (2013.01); *C04B 37/005* (2013.01); *C04B 2235/5288* (2013.01); *C04B 2235/616* (2013.01); *C04B 2237/06* (2013.01); *C04B 2237/062* (2013.01); *C04B 2237/064* (2013.01); *C04B 2237/083* (2013.01); *C04B 2237/086* (2013.01); *C04B 2237/12* (2013.01); *C04B 2237/16* (2013.01); *C04B 2237/365* (2013.01); *C04B 2237/38* (2013.01); *C04B 2237/385* (2013.01); *C04B 2237/597* (2013.01); *C04B 2237/62* (2013.01); *C04B 2237/64* (2013.01); *C04B 2237/86* (2013.01)

(58) Field of Classification Search
    USPC .................................................. 228/121, 174
    See application file for complete search history.

(56) References Cited

U.S. PATENT DOCUMENTS

| 2004/0162223 | A1* | 8/2004 | Walter ................ C04B 35/4508 505/230 |
| 2008/0190552 | A1* | 8/2008 | Bouillon et al. .............. 156/256 |
| 2009/0142608 | A1* | 6/2009 | Lineman et al. ............. 428/472 |
| 2012/0301691 | A1* | 11/2012 | Charleux ................ C04B 35/52 428/213 |

* cited by examiner

METHOD FOR BRAZING PARTS MADE FROM A COMPOSITE MATERIAL, WITH ANCHORING OF THE BRAZED JOINT

CROSS REFERENCE TO RELATED APPLICATIONS

This application is the U.S. National Stage of PCT/FR2013/051671, filed Jul. 12, 2013, which in turn claims priority to French Patent Application No. 1256947, filed Jul. 18, 2012, the entire contents of all applications are incorporated herein by reference in their entireties.

BACKGROUND OF THE INVENTION

The invention relates to using brazing to assemble together thermostructural composite materials, and in particular ceramic matrix composite (CMC) materials. CMC materials are typically formed by a porous substrate, such as a porous fiber substrate, that has been densified by a ceramic matrix. The fibers of the substrate may be made of carbon or of ceramic. By way of example, the matrix may be made of a refractory ceramic such as a refractory carbide, nitride, boride, or oxide. CMC materials, such as for example C/SiC composite materials (carbon fiber reinforcement with a silicon carbide matrix), are remarkable for their mechanical properties, which make them suitable for constituting structural elements, and for their ability to conserve those properties at high temperatures.

When making structures out of ceramic matrix composite materials, it is common to construct them from independent elements made of CMC materials, which elements are assembled together by brazing. Nevertheless, brazing ceramic matrix composite materials together is technically difficult, and the breaking stress of the brazed joint is often insufficient relative to the forces to which the assembly might be subjected, in particular shear forces.

Pieces made of CMC materials present a high degree of surface roughness, which prevents the brazing composition spreading well in the zone where the brazed joint is formed, thereby creating zones of weakness in the brazed connection.

Also, while the brazing composition is diffusing between the assembly faces of the parts to be brazed together, gas is given off due to reactions between the brazing composition and the ceramic particles used for conveying the brazing composition by capillarity between the assembly faces. Some of that gas becomes imprisoned inside the brazed joint, thereby leading to a brazed joint that is porous, and in which there remain local braze-free areas between the two surfaces. That lack of material leads to defects in the connection between the two parts, and consequently degrades the quality of the assembly by weakening the connection that is made.

OBJECT AND SUMMARY OF THE INVENTION

An object of the invention is to provide a method that enables parts made of composite material to be assembled together by brazing without presenting the above-mentioned drawbacks, and in particular that provides better anchoring of the brazed joint in the material of the parts and better discharge of the gas produced during the heat treatment for liquefying and diffusing the brazing composition. Another object of the invention is to propose a brazing technique that makes it possible to inspect the presence of the brazed joint at different points in the connection and thus to ensure that the brazed joint is present over the entire zone where it is to be formed.

In accordance with the invention, this object is achieved by a method wherein a plurality of cavities are made in the assembly face of at least one of the two composite material parts, with some or all of these cavities opening out into one or more portions of the part that are situated outside the assembly face, the molten brazing composition being transported by capillarity over the entire brazing zone by means of capillary elements arranged between the assembly faces of the composite material parts.

Thus, because of the presence of cavities in at least one of the assembly faces of the composite material parts, it is possible to anchor the brazed joint securely in the material of the part while making degassing possible during the brazing cycle, the gas being discharged via the ends of the cavities that open out outside the assembly faces.

Also, the presence of brazing at various locations in the zone in which the brazed joint is formed can be checked merely by visual inspection from the ends of the cavities that open out outside the assembly faces. Specifically, partial or complete absence of brazing in one or more cavities indicates that the brazed joint has not been formed in uniform manner over the entire brazing zone and that the connection might then include zones of weakness.

In a first aspect of the invention, a plurality of grooves are made in the assembly face of at least one of the two composite material parts, at least some of said grooves opening out into one or more faces adjacent to the assembly face of the part.

In a second aspect of the invention, a plurality of grooves are made in the assembly face of at least one of the two composite material parts, at least some of said grooves including perforations opening out into the face opposite from the assembly face of the part.

In a third aspect of the invention, at least some of the grooves extend over the assembly face of the part in a determined direction that is perpendicular to the direction of the forces to which the part is to be subjected.

In a fourth aspect of the invention, some of the grooves extend in the assembly face of the part in two determined directions that are perpendicular to each other.

In a fifth aspect of the invention, a plurality of perforations are made in the assembly face of at least one of the two composite material parts, at least some of said perforations opening out into the face opposite from the assembly face of the part.

In a sixth aspect of the invention, the capillary elements are selected from at least one of the following elements: particles of SiC, a web of SiC, a mat of carbon, particles of carbon, and nanotubes of carbon.

In a seventh aspect of the invention, the composite material parts for assembling together by brazing are afterbody parts of an aeroengine.

In an eighth aspect of the invention, the brazing composition is a metallic composition.

BRIEF DESCRIPTION OF THE DRAWINGS

Other characteristics and advantages of the invention appear from the following description of particular implementations of the invention, given as nonlimiting examples, and with reference to the accompanying drawings, in which.

DETAILED DESCRIPTION OF EMBODIMENTS

The brazing assembly method of the present invention applies to any type of thermostructural ceramic matrix composite (CMC) material, i.e. to any material made up of refractory fiber reinforcement (carbon fibers or ceramic fibers) densified by a ceramic matrix that is also refractory, such as C/SiC, SiC/SiC, C/C—SiC, etc. materials. This method also applies to other types of materials that give off gas during brazing, such as C/C materials or monolithic ceramics such as SiC, SiSiC, vitreous carbon, or pyrolytic carbon.

In accordance with the invention, cavities are formed in the assembly face of at least one of two parts of composite material that are to be assembled together, at least some of these cavities opening out into one or more faces or portions of the part lying outside the assembly face.

With reference to FIGS. 1A to 1E, an implementation of a method in accordance with the invention for assembling together two CMC material parts 10 and 20 by brazing comprises the following steps.

Figure 1A:
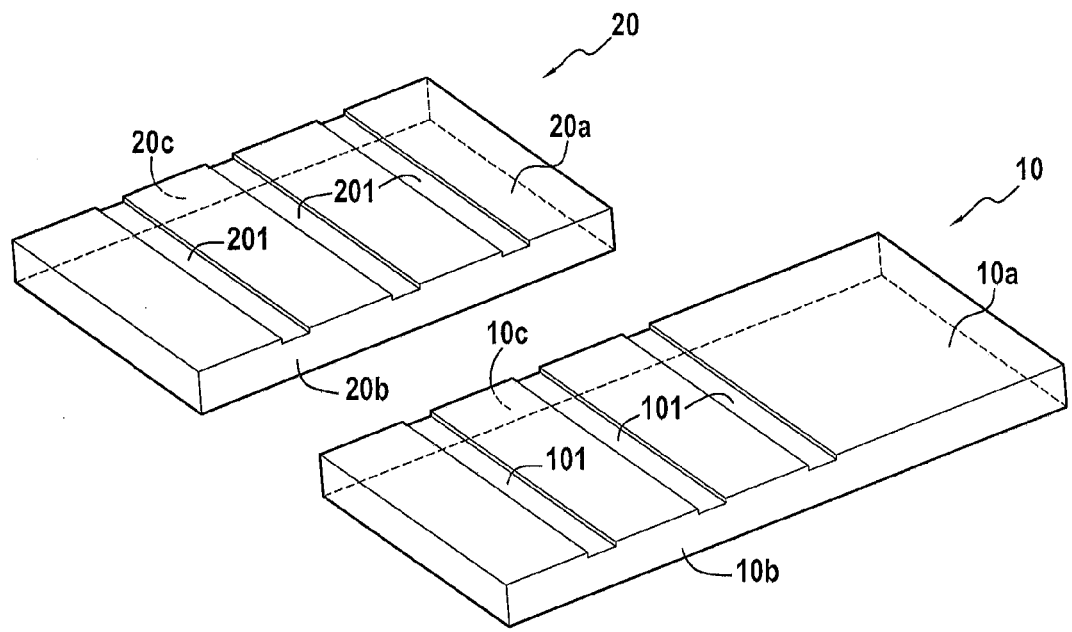
FIGS. 1A to 1E are diagrams showing the brazing of two parts made of ceramic matrix composite material in accordance with an implementation of the invention.

As shown in FIG. 1A, the first step consists in making cavities in the assembly faces 10a and 20a of the two parts 10 and 20. More precisely, in the presently described example, grooves 101 are machined in the assembly face 10a of the part 10, while grooves 201 are machined in the assembly face 20a of the part 20. The grooves 101 are open respectively to the side faces 10b and 10c of the part 10, while the grooves 201 are open respectively to the side faces 20b and 20c of the part 20.

Figure 1B:
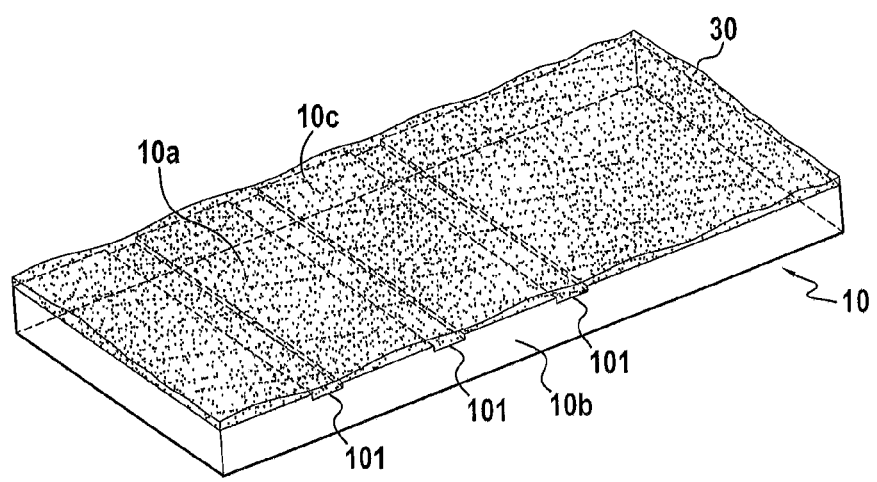

Thereafter, capillary elements, in this example particles of SiC 30, are arranged on the bonding face 10a of the part 10 (FIG. 1B). The particles of SiC are to enable the liquid brazing composition to be conveyed and to diffuse between the two parts 10 and 20 during the brazing operation. It is also possible to use other capillary elements, such as in particular: a web of SiC, a mat of carbon, particles of carbon, or nanotubes of carbon.

Figure 1C:
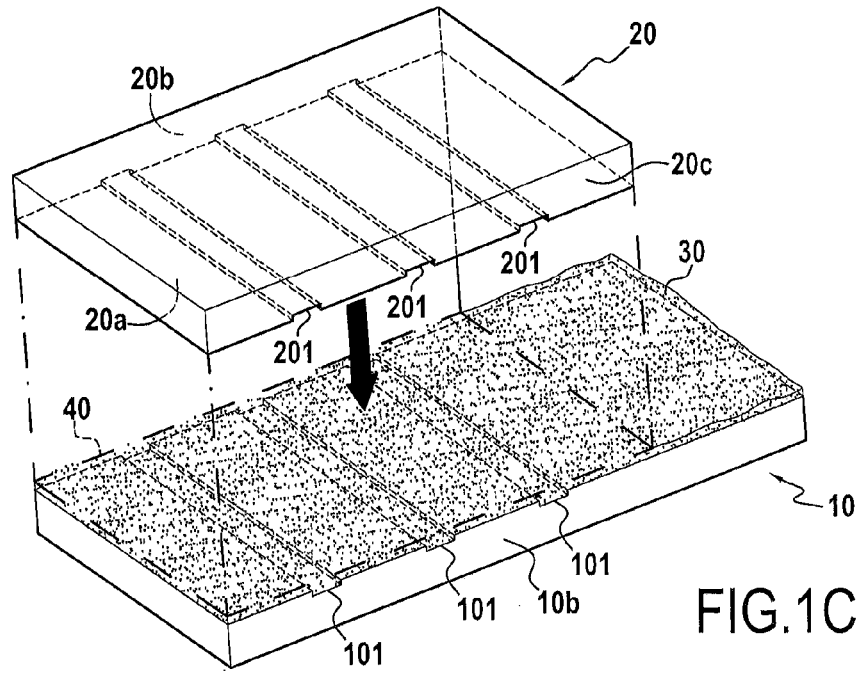
Figure 1D:
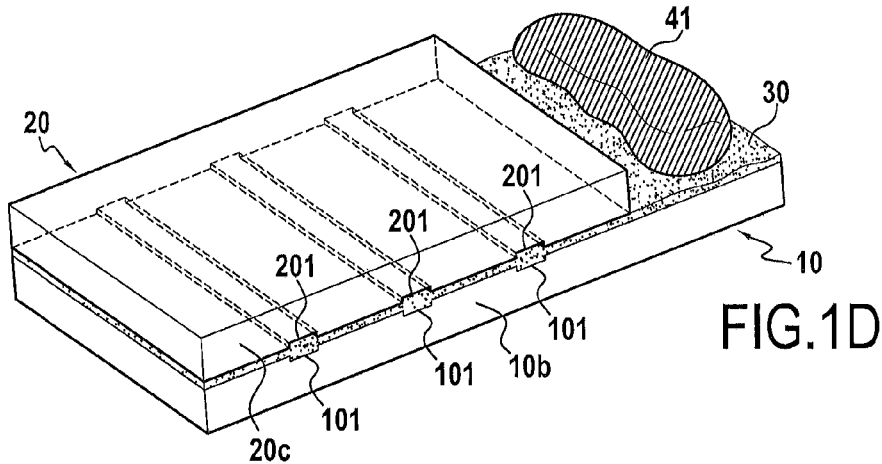

The part 20 is then positioned on the part 10 in such a manner as to cause the assembly faces 10a and 20a to face each other (FIG. 1C). The zone defined by the union of the facing portions of the bonding faces 10a and 20a corresponds to the brazing zone 40, i.e. the zone where the brazed joint is to be formed. A brazing composition 41 in the form of a solid paste is placed on the bonding face 10a outside the brazing zone 40 and in contact with the particles of SiC 30 that are present outside the brazing zone 40 (FIG. 1D). The brazing composition is selected in particular as a function of its compatibility with the composite material of the parts to be assembled together, i.e. it is preferable to choose a composition that has a coefficient of thermal expansion that is close to that of the composite material and that does not react at all with the composite material or that presents controlled reactivity therewith. By way of example, use may be made of compositions based on silicon as described in the following documents: EP 806 402, U.S. Pat. No. 5,975,407, US 2008/190552, and U.S. Pat. No. 7,497,918; of alloys of silicon plus metallic silicides, of silicon plus optionally alloyed germanium, and also of metallic compositions known under the tradenames: Cusil-ABA®, Ticusil®, Incusil®, or Brasic®

It is also possible to use compositions corresponding to mixtures of oxides selected from the following oxides: $SiO_2$, $Al_2O_3$, and MgO.

The following step consists in raising the temperature so as to make the brazing composition 41 liquid, which brazing composition is then sucked by capillarity by the particles of SiC 30 and spread over the entire brazing zone 40 present between the two parts 10 and 20. The gas produced during this heat treatment escapes via the grooves 101 and 201 through their portions opening out respectively in the side faces 10b, 10c, 20b, and 20c of the parts 10 and 20.

Figure 1E:
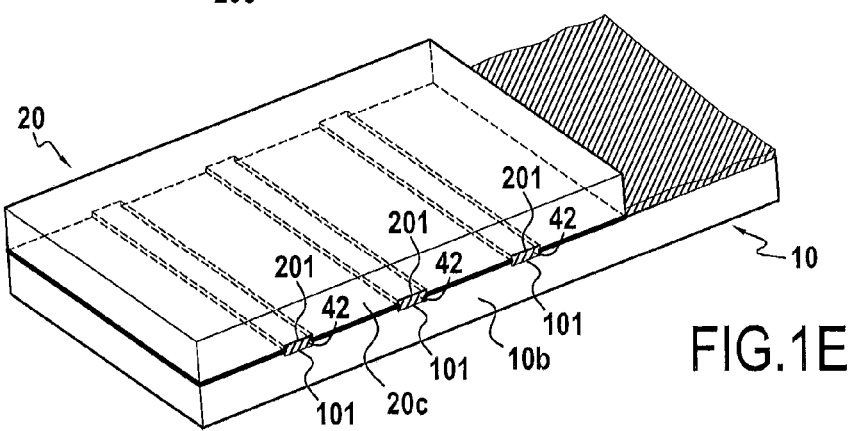

As shown very diagrammatically in FIG. 1E, a brazed joint 42 is thus obtained in contact with the assembly faces 10a and 20a of the two parts 10 and 20. The grooves 101 and 201 also form anchor portions for the brazed joint 41 in the composite material of the parts, thus serving to reinforce the brazed connection between the two parts.

Also, because of the prior formation of the grooves 101 and 201, the presence of brazing at various locations in the brazing zone can be verified merely by visual inspection from those portions of the grooves that open out into the side faces of the parts. Specifically, partial or complete absence of brazing in one or more grooves indicates that the brazed joint has not been formed in uniform manner over the entire brazing zone and that the connection might then include zones of weakness. Depending on the conditions of use of the assembled parts, it is possible to define a number and/or an extent of zones of weakness that can be accepted, below which the brazed joint does not need to be re-worked.

The number, the orientation, the shape, and the dimensions of the grooves in each bonding face of the parts made of composite material may be various. By way of example, the above-described grooves 101 and 201 may present a width of 2 millimeters (mm) for a depth of 0.3 mm, and they may be spaced apart from one another by a distance of 6 mm.

Furthermore, with grooves, the perforations opening out into the face opposite the bonding face of the part may also be machined in the bottoms of the grooves so as to add additional paths for degassing and/or inspecting the brazed joint.

The grooves are preferably oriented in such a manner as to form anchor portions in the brazed joint to oppose the main forces to which the assembly is to be subjected. For example, the grooves may extend in a direction substantially perpendicular to the direction of shear forces.

Figure 2:
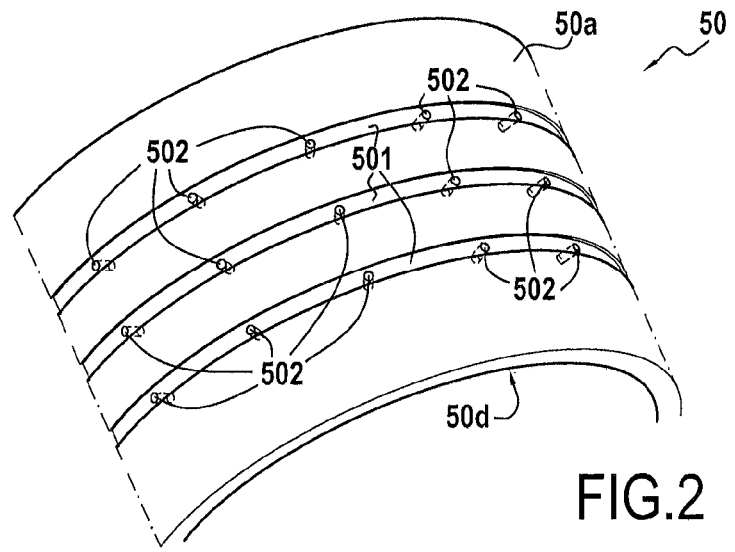
FIG. 2 is a diagrammatic perspective view of an axisymmetric part for brazing and including grooves and perforations in accordance with another implementation of the invention.

FIG. 2 shows a part 50 made of composite material and of axisymmetric shape, for example an aeroengine afterbody part, which part has an assembly face 50a for assembling by brazing with another part that is also axisymmetric (not shown in FIG. 2) under the same conditions as those described above. In accordance with the invention, grooves 501 are machined in the assembly face 50a of the part 50. The grooves 501 are oriented circumferentially relative to the part so as to improve the mechanical strength of the brazed joint, the anchor portions as formed in this way by the grooves opposing axial tear-out forces that may be applied to one or both parts. In this example, the grooves 501 do not open out outside the assembly face of the part 50. In order to enable the brazed joint to degas and to be inspected after brazing, perforations 502 opening out in the face 50*d* opposite from the assembly face 50*a* of the part are also machined in the bottoms of the grooves 501.

Figure 3:
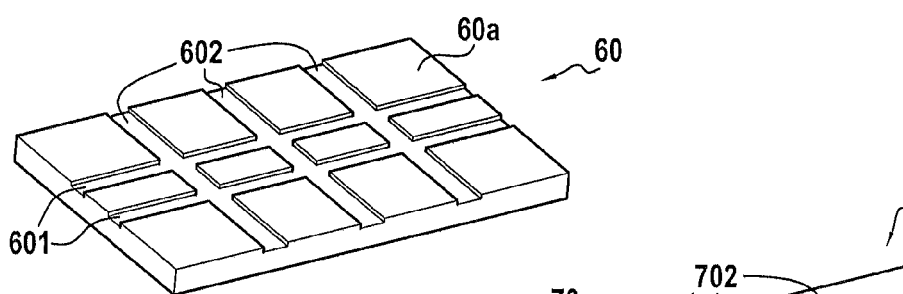
FIG. 3 is a diagrammatic perspective view of a part for brazing and including grooves extending in two perpendicular directions in accordance with another implementation of the invention.

FIG. 3 shows a part 60 including on its bonding face 60*a* a first series of grooves 601 extending in a first direction, and a second series of grooves 602 extending in a second direction perpendicular to the direction in which the grooves 601 extend. By way of example, for a part that is axisymmetric, the grooves in one of these two series serve to form anchor points that oppose axial tear-out forces, while the grooves in the other series serve to form paths for degassing and inspecting the brazed joint.

Figure 4:
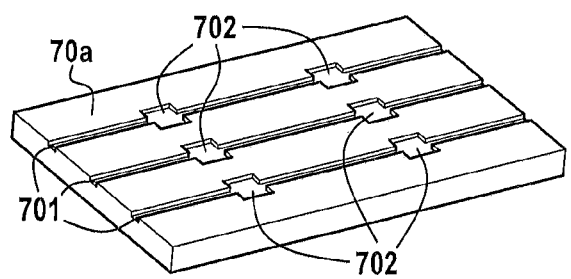
FIG. 4 is a diagrammatic perspective view of a part for brazing and including grooves extending in a first direction, the grooves including portions that extend in a second direction perpendicular to the first direction, in accordance with another implementation of the invention.

FIG. 4 shows a part 70 including grooves 701 in its assembly face 70*a*, which grooves 701 present portions 702 that extend in a direction perpendicular to the longitudinal direction in which the grooves 701 extend in the part 70. Under such circumstances, the portions 702 can form anchor points that oppose forces applied in a direction substantially perpendicular to the direction in which the portions 702 extend, while the grooves 701 provide paths for degassing and inspecting the brazed joint.

Figure 5:
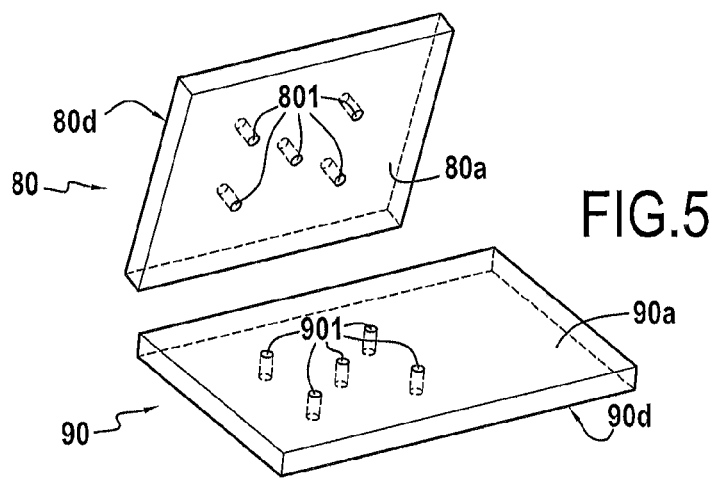
FIG. 5 is a diagrammatic perspective view of two parts for brazing together and each including perforations in accordance with another implementation of the invention.

The cavities made in the bonding faces of the parts may also correspond to perforations. FIG. 5 shows two parts 80 and 90 made of composite material that are to be assembled together by brazing, each of which includes in its respective assembly face 80*a* and 90*a* perforations 801 and 901, e.g. having a diameter of 1 mm and being spaced apart from one another by about 1 mm to 2 mm. The perforations 801 open out into the face 80*d* opposite from the assembly face 80*a* of the part 80, while the perforations 901 open out into the face 90*d* opposite from the assembly face 90*a* of the part 90. The perforations 801 and 901 serve both to form anchor points that improve the strength of the brazed joint that is formed subsequently, and paths for degassing and for inspecting the brazed joint.

The invention claimed is:

1. A method of assembling together by brazing two parts each made of composite material, each part having an assembly face for brazing with the assembly face of the other part, the method comprising:
    making a plurality of cavities in the assembly face of at least one of the two composite material parts, at least some of said cavities opening out into one or more portions of the part that are situated outside the assembly face;
    interposing capillary elements between the assembly faces of the composite material parts;
    placing a brazing composition in contact with a portion of the capillary elements; and
    applying heat to liquefy the brazing composition so as to cause the molten brazing composition to spread by capillarity via the capillary elements between the assembly faces of the composite material parts,
    wherein a plurality of grooves are made in the assembly face of at least one of the two composite material parts, at least some of said grooves including perforations formed in a surface thereof opening out into the face opposite from the assembly face of the at least one of the two composite material parts.

2. A method according to claim 1 wherein the part is configured for use in an assembly in which a primary force is applied to the part in a known direction and at least some of the grooves extend over the assembly face of the part in a determined direction that is perpendicular to the direction of the primary force to which the part is to be subjected.

3. A method according to claim 1 wherein some of the grooves extend in the assembly face of the part in two determined directions that are perpendicular to each other.

4. A method according to claim 1 wherein the capillary elements are selected format least one of the following elements: particles of SiC, a web of SiC, a mat of carbon, particles of carbon, and nanotubes of carbon.

5. A method according to claim 1, wherein the composite material parts for assembling together by brazing are afterbody parts of an aeroengine.

6. A method according to claim 1, wherein the brazing composition is a metallic composition.

7. A method according to claim 1, wherein the brazing composition is a silicon based composition.

8. A method according to claim 1, wherein the brazing composition comprises a mixture of oxides selected from the group consisting of: $SiO_2$, $Al_2O_3$, and MgO.

9. A method according to claim 1, further comprising:
    after the applying heat, obtaining a brazed joint; and
    inspecting the brazed joint by determining a presence or absence of brazing in the grooves.

* * * * *